United States Patent [19]

Goto et al.

[11] 3,889,060

[45] June 10, 1975

[54] FEEDBACK AMPLIFIER DISTORTION-CANCELLING CIRCUIT

[75] Inventors: Toshiyuki Goto, Kadoma; Kouichi Kido, Neyagawa; Akitoshi Yamada, Daito, all of Japan

[73] Assignee: Matsushita Electric Industrial Co., Ltd., Osaka, Japan

[22] Filed: Sept. 10, 1973

[21] Appl. No.: 395,431

[30] Foreign Application Priority Data

| | | |
|---|---|---|
| Sept. 11, 1972 | Japan | 47-91544 |
| May 18, 1973 | Japan | 48-55866 |
| May 30, 1973 | Japan | 48-61295 |
| Aug. 15, 1973 | Japan | 48-91827 |
| Aug. 5, 1973 | Japan | 48-91828 |

[52] U.S. Cl. .................................................. 179/1 F

[51] Int. Cl. .................................................. H03f 1/32

[58] Field of Search ............ 179/1 A, 1 F; 325/404, 325/405, 476; 330/149, 124, 84, 75, 88, 89, 330/100, 151, 86

*Primary Examiner*—Kathleen H. Claffy
*Assistant Examiner*—E. Matt Kemeny
*Attorney, Agent, or Firm*—Stevens, Davis, Miller & Mosher

[57] ABSTRACT

A sound reproducing system, in which sound distortion generated due to non-linear characteristics of amplifier and speaker is detected through operation of motional component of the speaker drive or speaker cone paper and is fed in opposite polarity back to the input side thereby reducing the distortion alone without lowering the efficiency of the amplifier and speaker.

7 Claims, 14 Drawing Figures

OPPOSITE CHARACTERISTICS OF $K_1$

FEEDBACK AMPLIFIER DISTORTION-CANCELLING CIRCUIT

This invention relates to sound reproducing systems in which distortion components of sound are removed in the speaker and the speaker drive.

The prior art systems where the characteristics of the conversion system is varied by coupling an amplifier to a speaker, include two types, namely 1. MFB (motional feedback) and
2. Compressor (sound pressure rectification feedback system)

In these prior art feedback systems, however, the distortion generated from the speaker cannot be sufficiently reduced and can be reduced only within a limited range because of the delay time involved in the electric-to-sound conversion system in the speaker system. Also, the efficiency of the amplifier or speaker constituting the speaker system is extremely reduced.

An object of the invention is to preclude the above drawbacks inherent in the prior art by providing a sound reproducing system, in which the distortion generated due to non-linear characteristics of the speaker can be reduced.

The sound reproducing system according to the invention provides such an excellent effect that distortion can be reduced without reducing the efficiency of the speaker or amplifier.

The above and other objects, features and advantages of the invention will become more apparent from the following description when the same is read in conjunction with the accompanying drawings, in which.

Figures 3A, 3B:
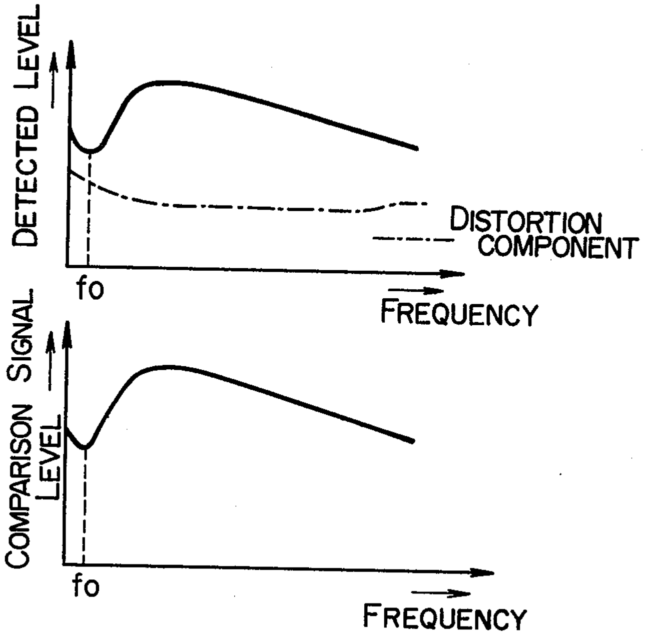
Figure 4:
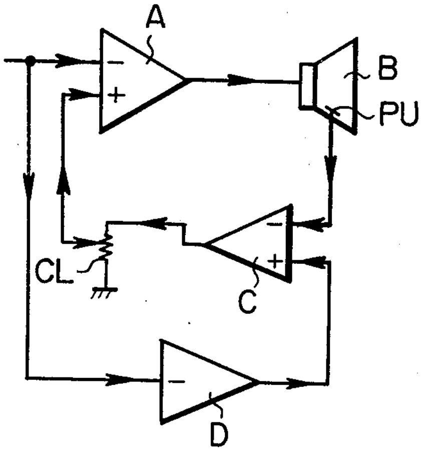
Figure 5:
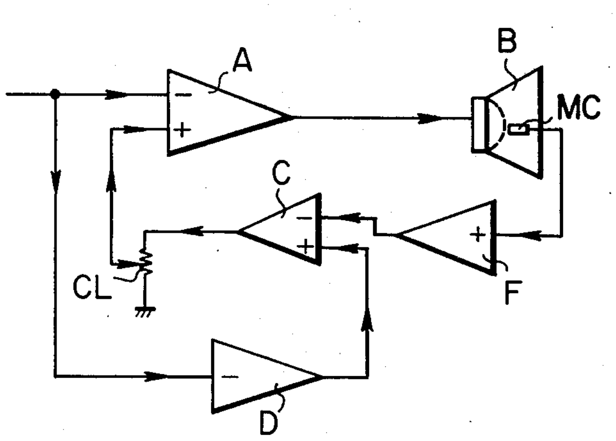
Figure 6:
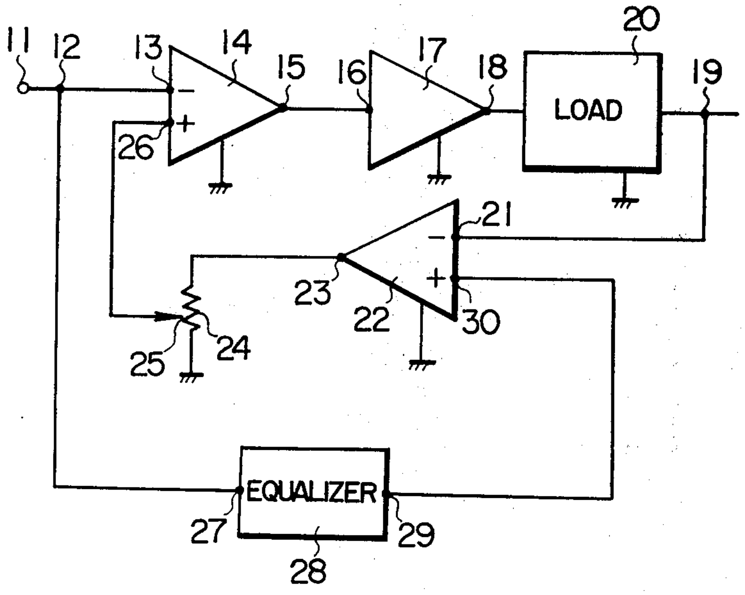
Figure 7:
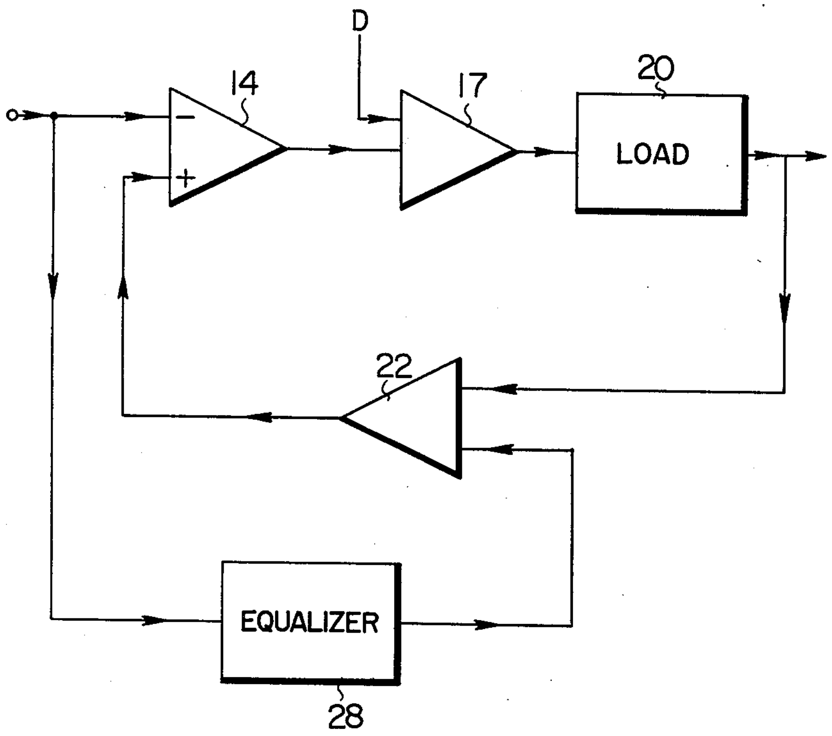
Figure 8:
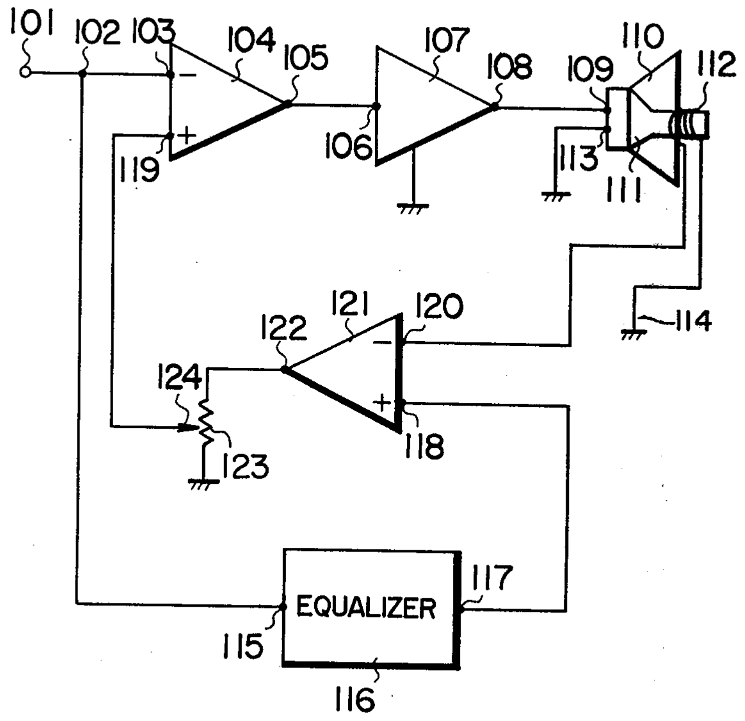
Figure 9:
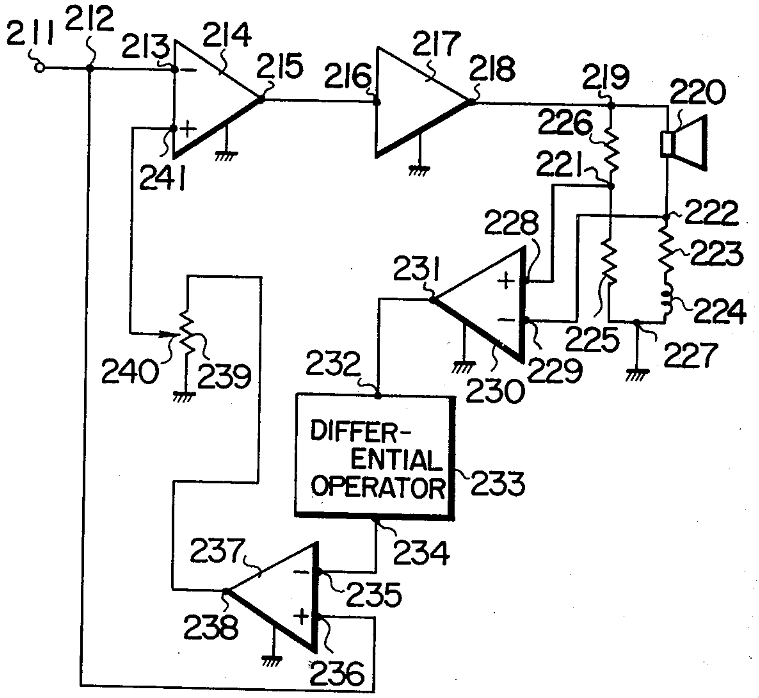
Figure 10:
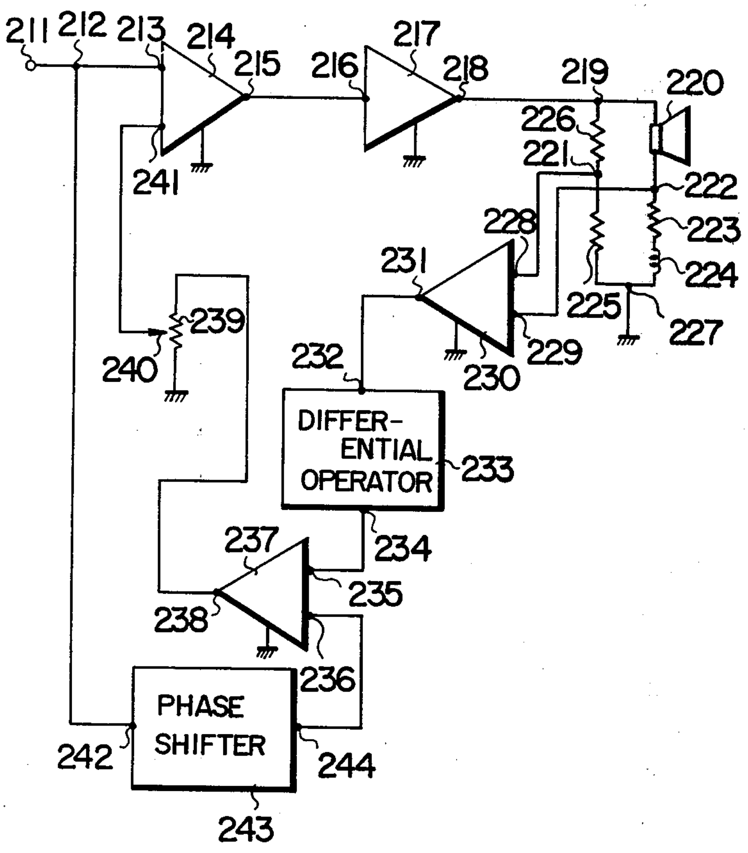
Figure 11:
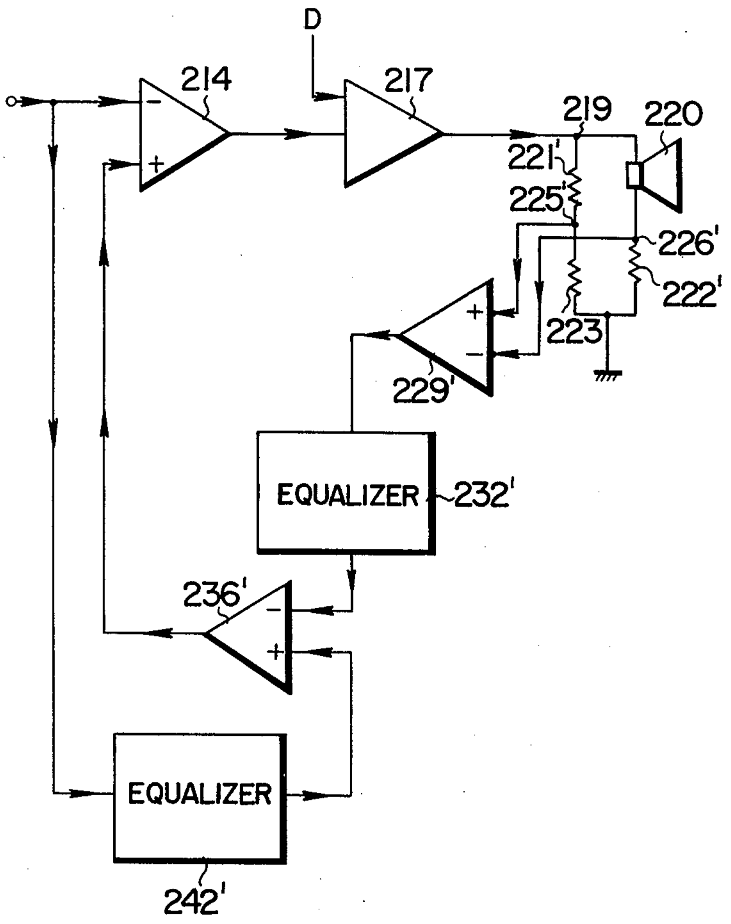
Figure 12A:
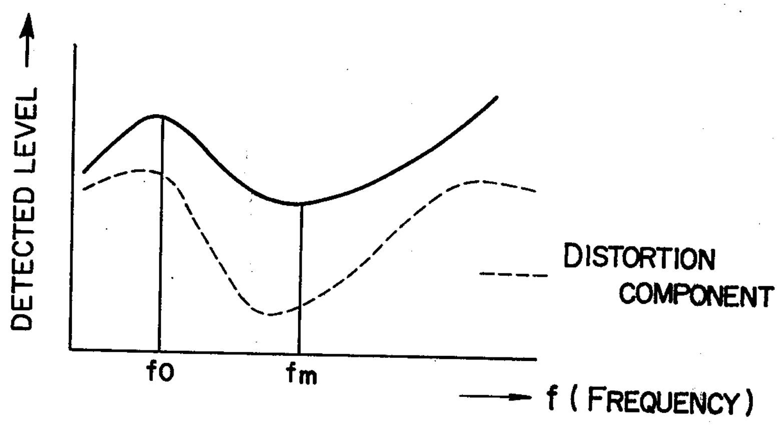

FIG. 3*a* shows a frequency characteristic of detected signal from speaker B;

FIG. 3*b* shows a frequency characteristic of the output of equalizer D;

FIG. 4 is a circuit diagram of another embodiment of the sound reproducing system according to the invention;

FIG. 5 is a circuit diagram of a further embodiment of the sound reproducing system according to the invention;

FIG. 6 is a circuit diagram of a still another embodiment of the sound reproducing system according to the invention;

FIG. 7 is a block diagram of a sound reproducing system according to the invention;

FIG. 8 is a circuit diagram showing a further embodiment of the sound reproducing system according to the invention;

FIG. 9 is a circuit diagram showing a still further embodiment of the sound reproducing system according to the invention;

FIG. 10 is a circuit diagram showing a yet further embodiment of the sound reproducing system according to the invention;

FIG. 11 is a circuit diagram showing a further embodiment of the sound reproducing system according to the invention;

FIG. 12*a* shows a characteristic of the output of detector 229; and

Figure 12B:
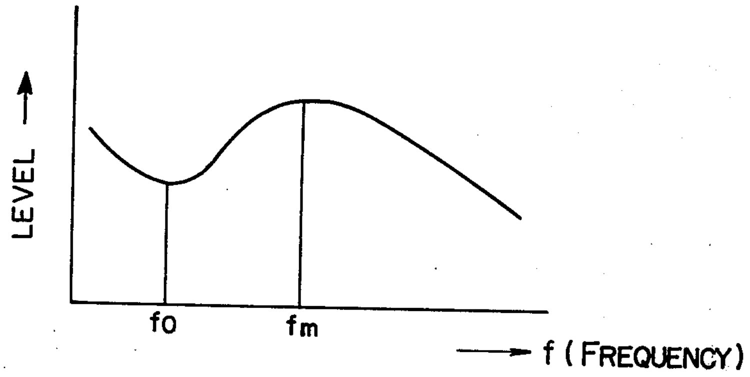

FIG. 12*b* shows a characteristic of the output of equalizer 232.

The principal arrangement according to the invention will now be discussed in connection with FIG. 1.

Figure 1:
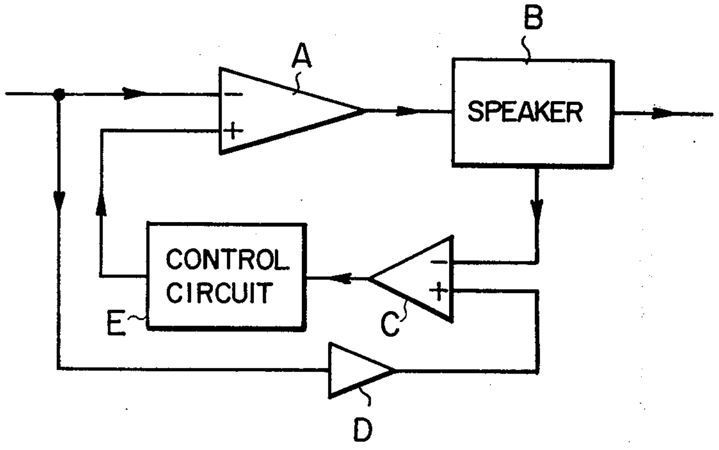
FIG. 1 is a block diagram showing the principal arrangement according to the invention.

Referring to FIG. 1, reference symbol A designates an amplifier, B a speaker driven by the output of the amplifier, C an operational comparator for comparing a detection signal from the speaker and a signal derived from the original signal through an equalizer D to obtain only a distortion component, and E a control circuit. The distortion component obtained from the operational comparator C is converted through the circuit E into an opposite-polarity signal which is coupled to the amplifier A.

In this way, according to the invention the distortion of the speaker current due to the non-linearity of the speaker B is removed by taking out only the distortion component contained in the detection signal from the speaker B through the operational comparator C and coupling an opposite polarity signal of the distortion component to the amplifier A.

Now, some preferred embodiments of the invention will be described with reference to the drawing.

Figure 2:
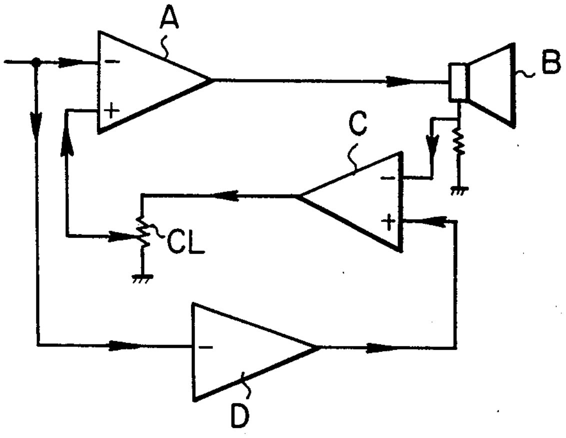
FIG. 2 is a circuit diagram of an embodiment of the sound reproducing system according to the invention.

Referring now to FIG. 2, which shows an embodiment of the invention, symbol A refers to an amplifier, B a speaker, C an operational comparator, D an equalizer, and CL a distortion component controller. The original signal added to the minus input terminal of the amplifier A is amplified therethrough, and the speaker B is driven by the output signal of the amplifier A. The current flowing in the speaker B contains the aforementioned distortion component. Accordingly, a voltage proportional to the current flowing in the speaker B is taken out and coupled to the minus input terminal of the operational comparator C. Meanwhile, the original signal is coupled through the equalizer D to the plus input terminal of the operational comparator C. The output of the equalizer D has a frequency characteristic as shown in FIG. 3*b*, which is similar to that of the detection signal from the speaker B as shown in FIG. 3*a*. In the operational comparator C only the original signal component is cancelled out, and the distortion component is amplified and led out of the output terminal. The distortion signal thus led out is coupled to the distortion component controller CL, whose output is in turn coupled to the plus terminal of the amplifier A, for controlling the speaker output to obtain a desired reduced distortion factor. Since the signal added to the plus terminal of the amplifier A is opposite in polarity to the distortion of the current in the speaker B, so that it cancels the distortion in the speaker for fidelity reproduction of the original signal. The broken curve shown in FIG. 3 represents the frequency characteristic of the distortion component.

FIG. 4 shows another embodiment of the invention. This embodiment is similar in operation and effects to the preceding embodiment except that the detection signal coupled to the operational comparator C here is obtained from a pick-up PU, which is provided in the speaker B to detect the vibration thereof.

FIG. 5 shows a still another embodiment. This embodiment is also similar in operation and effects to the preceding embodiments except that the signal coupled to the operational comparator C is obtained from microphone preamplifier F amplifying a detection signal from a microphone MC detecting the sound pressure in the speaker B.

FIG. 6 shows a further embodiment of the invention. In FIG. 6, numeral 11 designates an input terminal, numeral 14 a comparator having an inversion input terminal (or minus input terminal) 13, a non-inversion input terminal (or plus input terminal) 26 and an output terminal 15, numeral 17 an amplifier having an input terminal 16 and an output terminal 18, numeral 20 a load of the amplifier 17, numeral 22 an operational comparator having an inversion input terminal (or minus input terminal) 21, a non-inversion input terminal (or plus input terminal) 30 and an output terminal 23, numeral 24 a controller having a control output terminal 25, and numeral 28 an equalizer having an input terminal 27 and an output terminal 29. Numeral 12 designates a connection point through which the signal from the input terminal 11 is coupled to the comparator 14 and the equalizer 28, and numeral 19 a connection point through which the output signal given from the amplifier 17 to the load 20 is taken out and coupled to the operational comparator 22.

The operation of the negative feedback amplifier of the construction of FIG. 6 when a signal is added to the input terminal 11 will now be described.

The input signal appearing at the input terminal 11 is coupled through the connection point 12 to the minus input terminal 13 of the comparator 14 and also to the input terminal 27 of the equalizer 28. The comparator 14 provides at its output terminal 15 an output corresponding to the difference between its inputs appearing at the minus and plus input terminals 13 and 26. The signal from the output terminal 15 is coupled to the input terminal 16 of the amplifier 17 and amplified thereby at a predetermined gain, and the output therefrom is coupled from the output terminal 18 to the load 20. The signal obtained from the connection point 19 has a waveform different from that of the input signal or contains a so-called distortion component due to various non-linear factors of the amplifier 17 and load 20 itself.

This signal is added to the minus input terminal 21 of the operational comparator 22, while the signal coupled through the equalizer 28 is added from the output terminal 29 thereof to the plus input terminal 30 of the operational comparator 22 for comparison with the input signal added to the input terminal 11. The levels of both the input signals here are set equal at a reference frequency. At the output terminal 23 of the operational comparator 22, there are detected various signals out of coincidence with the input signal, that is, various distortions such as phase distortions, harmonic distortions, intermoduration distortions and transient distortions produced in the amplifier 17 or load 20. The detected distortion component is added to the controller 24 and is coupled from the control output terminal 25 thereof to the plus terminal 26 of the comparator 14 for controlling the output to a desired distortion level. At this time, the distortion component signal added to the terminal of the comparator 14 is opposite in polarity to the distortions generated in the amplifier 17 or load 20 so that the signal obtained at the output terminal 19 of the system contains reduced distortion.

The sound reproducing system according to the invention will now be discussed theoretically in connection with FIG. 7.

Referring to FIG. 7, it is assumed that the gain of the comparator 14 is unity, the gain of the amplifier 17 at the reference frequency is $A_1$, the conversion efficiency of the load 20 at the reference frequency for detecting the output signal from the load is T, and that the gain of the operational comparator 22 is $A_2$. Also, the distortion due to the internal factors of the system and/or external factors is represented as equivalent noise input voltage D to the amplifier 17.

Denoting the output of the operational amplifier 22 by $\Delta x$ (distortion component) and the input signal by x, the output X of the system is $$X = TA_1 [(\Delta x - x) + D] \ldots \quad (1)$$

and the distortion component $\Delta x$ is $$\Delta x = A_2(-Kx - x) \ldots \quad (2)$$

From equations 1 and 2 we have $$X = -TA_1(1+A_2K)x/(1+A_1A_2T) + DA_1T/(1+A_1A_2T) \quad (3)$$

Hence, the distortion component D' is $$D' = DA_1T/(1+A_1A_2T) \ldots \quad (4)$$

By setting $A_2 \rightarrow \infty$, the fundamental wave component X is $$X = -Kx \ldots \quad (5)$$

Thus, the gain for the fundamental wave is -Kx. Also, K has a gain of $A_1$ at the reference frequency and has predetermined gain and phase characteristics independent of the frequency. In other words, the phase characteristic of the output of the system depends upon the characteristics of K, and fidelity reproduction of the waveform of the input signal can be obtained at the output terminal of the load.

A further embodiment of the invention will now be described with reference to FIG. 8. In the Figure, numeral 104 designates a comparator having an inversion input terminal (or minus input terminal) 103, a non-inversion input terminal (or plus input terminal) 119 and an output terminal 105, numeral 107 an amplifier for amplifying a voltage appearing at an input terminal 106 to a predetermined voltage, numeral 110 a speaker, numeral 111 a detector provided on the cone of the speaker 110 and having a detecting coil 112, numeral 121 an operational comparator for comparing the detected voltage and the equalizer output to take out only the distortion component, numeral 123 a controller for controlling the detected distortion component to a desired distortion level, and numeral 116 an equalizer for matching the level and phase of the original signal to the level and phase of the detected signal. In FIG. 8, the original signal appearing at the input terminal 101 is coupled through point 102 to the input terminal 103 of the comparator 104 and the input terminal 115 of the equalizer 116. The original signal appearing at the input terminal 103 is compared with a signal appearing at the input terminal 119 for comparison therewith to produce an output at the output terminal 105. This output is coupled to the input terminal 106 of the amplifier 107 and amplified at a predetermined gain, and the amplified output is applied between the terminals 109 and 113 of the speaker 110. In the speaker 110, this output is detected by the detector provided on the cone paper of the speaker 110 to obtain a voltage proportional to the speed of the cone paper between the input terminal 120 of the operational comparator 121 and ground terminal 114. The speaker 110, however, has various inherent non-linear factors, so that the detected signal has a waveform different from the original signal waveform, that is, it contains a distortion component. On the other hand, the voltage appearing at the output terminal 117 does not contain any distortion component.

The output of the equalizer 116 is coupled to the input terminal 118 of the operational comparator 121 for operational comparison with the detected signal to obtain only the distortion component, which appears at the output terminal 122. This output terminal 122 is connected to the controller 123, so that a signal with distortion reduced to a desired level is obtained at the output terminal 124 and is given to the input terminal 119 of the afore-mentioned comparator 104. The aforementioned distortion component is coupled in opposite polarity to the original signal.

With the above construction according to the invention, it is possible to reduce the distortion generated due to the non-linearity of the speaker without lowering the gain of the system.

A further embodiment of the invention will now be described with reference to FIG. 9. In the Figure, numeral 211 designates an input terminal, numeral 213 an inversion input terminal (minus input terminal) of a comparator 214, numeral 241 a non-inversion input terminal (plus input terminal) of the comparator 214, numeral 215 an output terminal of the comparator 214, numeral 217 an amplifier having an input terminal 216 and an output terminal 218, numeral 220 a speaker, numerals 225, 226, 223 and 224 resistors and an inductor balanced with the speaker 220, numeral 230 a motional detector having an inversion input terminal (minus input terminal) 229, a non-inversion input terminal (plus input terminal) 228 and an output terminal 231, numeral 233 a differential operator having an input terminal 232 and an output terminal 234, numeral 237 an operational comparator having an inversion input terminal (minus input terminal) 235, a non-inversion input terminal (plus input terminal) 236 and an output terminal 238, and numeral 239 a controller having a control output terminal 240. Numeral 212 designates a connection point through which the signal from the input terminal 211 is coupled to the comparator 214 and plus input terminal 236 of the operational comparator, and numeral 227 a connection point through which the motional detector bridge is grounded.

The operation of the speaker system of the construction of FIG. 9 when a signal is coupled to the input terminal 211 will now be described.

The input signal appearing at the input terminal 211 is coupled through the connection point 212 to the minus input terminal 213 of the comparator 214 and the plus input terminal 236 of the operational comparator 237. The comparator 214 provides at its output terminal 215 an output representing the difference between its inputs to the minus and plus terminals 213 and 241. The signal from the output terminal 215 is coupled to the input terminal 216 of the amplifier 217 and amplified thereby at a predetermined gain, and the output therefrom is coupled from the output terminal 218 to the bridge load consisting of the bridge resistors 223, 225 and 226, bridge inductor 224 and speaker 220. The bridge has motional component detection points 221 and 222 respectively connected to the plus and minus input terminals 228 and 229 of the motional detector 230. Thus, an inverse electromotive force due to the motion of the speaker 220, that is, a component due to the speaker motion, is detected at the output terminal 231. This speed component includes distortions generated due to non-linear characteristics of the speaker 220 and amplifier 217. This signal is coupled to the input terminal of the differential operator 233 to produce at the terminal 234 an acceleration component, which is coupled to the minus input terminal 235 of the operational comparator 237, while the input signal is coupled through the connection point 212 to the plus input terminal 236 of the operational comparator 237 for comparison of the acceleration component signal with the input signal appearing at the input terminal 211. At the output terminal of the operational comparator 237 there are detected various distortions generated in the speaker due to various high frequency resonances and non-linear characteristics of support means. The detected distortion component is amplified, and the amplified output is added to the controller 239 and is coupled from the control output terminal 240 thereof to the plus input terminal 241 of the comparator 214 for controlling the output of the system to a desired characteristics. At this time, the distortion component signal added to the plus input terminal 241 is proportional to the opposite polarity of the distortions generated in the speaker 220 which constitutes the load of the amplifier 217, so that the output of the speaker 220 has a flat characteristic with reduced distortion.

FIG. 10 shows a further embodiment of the invention, in which use is made of a phase shifter 243 for matching the phases of components of the input signal from connection point 212 at $f_0$ and at higher resonance frequencies. By so doing, a greater distortion component can be detected, which is more effective for preventing the oscillation.

It will thus be understood from the above embodiment that with the speaker system according to the invention distortions generated due to non-linear factors of the amplifier or speaker and undesired resonance of the speaker can be eliminated.

FIG. 11 shows a further embodiment of the invention. In FIG. 11, numeral 214 designates a comparator having an inversion input terminal (or minus input terminal) and a non-inversion input terminal (or plus input terminal), numeral 217 an amplifier with an amplification degree of $A_1$, and numeral 220 a speaker constituting a bridge together with resistors 221′, 222′ and 223. The speaker 220 can be regarded as resistance at intermediate frequencies, so that the aforementioned bridge is balanced at intermediate frequencies. A voltage proportional to the motional component due to the motion of the speaker and to the electric impedance of the speaker is obtained at the output terminal of the detector 229′. The characteristic of this voltage is as shown in FIG. 12a, including a greater proportion of the motional component due to the motion of the speaker at frequencies in the vicinity of $f_0$ ($f<f_m$) and a greater proportion of the component due to the electric impedance of the speaker at high frequencies ($f>f_m$). The frequency $f_m$ is one at which the nominal impedance of the speaker is a pure resistance. The detected signal is corrected, for instance through an equalizer 232′ with $K_1$ (transfer function), to a signal having an opposite characteristic as shown in FIG. 12*b*, which is added to the minus input terminal of the operational comparator 236', while a signal obtained by matching the input signal level to the detected signal through an equalizer 242' with $K_2$ (transfer function) is coupled to the plus input terminal of the operational comparator 236' for amplifying only the distortion component constituted by the speaker's motional component and one due to the nonlinearity of the electric impedance of the speaker, the amplified distortion component being coupled to the plus input terminal of the comparator 214. The detected distortion signal is cancelled out since it is coupled in opposite polarity to the motional distortion and electric impedance distortion generated in the speaker 220.

The invention will now be theoretically discussed in connection with FIG. 11. Referring to FIG. 11, it is assumed that the comparator 214 has a gain of unity, the detector 229' has a gain of unity, and the operational comparator has an amplification degree of $A_3$. Also, it is assumed that the distortions generated in the system and/or those due to external disturbance factors are represented as an equivalent noise input voltage D to the amplifier 217, and the conversion efficiency of the output of the detector 229' from the output of the amplifier 217 detected by the bridge is T.

Denoting the output of the operational comparator by x, the output of the detector 229' is $$X = TA_1\,[(\Delta x\text{-}x) + D] \ldots \qquad (1')$$

and Δx is $$\Delta x = A_3\,(K_2x - K_1X) \ldots \qquad (2')$$

From equations 1' and 2' we have $$X = -A_1T(1\text{-}A_3K_2)\times/(1+A_1A_3K_1T) + DTA_1/(1+A_1A_3K_1T) \ldots \qquad (3')$$

Hence, the distortion component D' is $$D' = DA_1T/(1+A_1A_3K_1T) \ldots \qquad (4')$$

If $K_1$ and $K_2$ are set such that $$K_1 = 1/A_1T \ldots \qquad (5')$$

$$\text{and } K_2 = -1 \ldots \qquad (6')$$

From equations 3', 5' and 6' the fundamental wave component X is reduced to $$X = -A_1Tx \ldots \qquad (7')$$

If we set $A_3 \rightarrow \infty$ $$X = K_2/K_1 \ldots \qquad (8')$$

In this way, the distortion can be eliminated.

What we claim is:

1. A sound reproducing system comprising an amplifier for amplifying an input signal, a speaker driven by the output of said amplifier, and a differential amplifier for comparing a signal derived from said speaker containing a distortion component generated due to the non-linear characteristics of said speaker with another signal obtained in proportion to said input signal to extract only the distortion component, the output of said differential amplifier being coupled in opposite polarity to said amplifier, thereby eliminating the distortion component.

2. A sound reproducing system comprising a comparator for combining a distortion component in opposite polarity with an input signal, an amplifier for amplifying an output signal of said comparator, a speaker connected to the output terminal of said amplifier, an equalizer for equalizing the levels of said input signal to an output signal derived from said speaker at a reference frequency, and a differential amplifier for comparing the output signal of said speaker with the output signal of said equalizer to extract only said distortion component generated due to the non-linear characteristics of said amplifier and speaker.

3. A sound reproducing system comprising a comparator for combining a distortion component in opposite polarity with an input signal, an amplifier for amplifying an output signal of said comparator, a speaker driven by the output of said amplifier, a detecting coil provided in said speaker and producing a voltage proportional to the speed of the cone paper of said speaker, an equalizer for equalizing the level and phase of said input signal to those of the signal generated from said detecting coil, and a differential amplifier for comparing said signal generated from said detecting coil with the output signal of said equalizer to extract only said distortion component included in said signal from said detecting coil.

4. A sound reproducing system comprising a comparator for combining a motional distortion component in opposite polarity with an input signal, an amplifier for amplifying an output signal of said comparator, a motional component detecting bridge having one arm constituted by a speaker driven by the output of said amplifier, a motional detector connected to said motional component detecting bridge for detecting a distortion component from said speaker, a differential operator connected to said motional detector for producing an acceleration component signal, and a differential amplifier for comparing the output signal of said differential operator with said input signal to extract only said motional distortion component, the output of said differential amplifier being coupled in opposite polarity to said comparator.

5. A sound reproducing system according to claim 4, which further comprises a phase shifter for shifting only the phase of said input signal, the phase-shifted output signal of said phase shifter being compared with the output signal of said differential operator in said differential amplifier to extract only said distortion component for coupling in opposite polarity to said comparator.

6. A sound reproducing system comprising a comparator for combining a distortion component in opposite polarity with an input signal, an amplifier for amplifying an output signal of said comparator, a speaker connected to the output terminal of said amplifier, a bridge detection circuit consisting of said speaker and resistors, a motional detector connected to said bridge detection circuit for generating an output signal including a motional component of said speaker and a voltage proportional to an electrical impedance of said speaker, a first equalizer for converting the output signal of said motional detector to the opposite polarity, a second equalizer for equalizing the level, phase and frequency of said input signal to those of the output signal of said first equalizer proportional to the motional component of the speaker and the electric impedance of the speaker, and a differential amplifier for comparing said output signal of said motional detector with said output signal of said second equalizer to extract only said distortion component generated due to non-linear characteristics of said speaker and said amplifier.

7. A sound reproducing system according to claim 1, which further comprises an equalizer for equalizing the level of said input signal to said signal derived from said speaker at a reference frequency, the output of said equalizer being supplied to said differential amplifier.

* * * * *